(12) United States Patent
Yamazaki

(10) Patent No.: US 9,545,949 B2
(45) Date of Patent: Jan. 17, 2017

(54) STEERING CONTROL APPARATUS AND A STEERING APPARATUS USING THE SAME

(75) Inventor: Ippei Yamazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 882 days.

(21) Appl. No.: 12/675,153

(22) PCT Filed: Jul. 24, 2008

(86) PCT No.: PCT/JP2008/063316
§ 371 (c)(1),
(2), (4) Date: Feb. 25, 2010

(87) PCT Pub. No.: WO2009/066488
PCT Pub. Date: May 28, 2009

(65) Prior Publication Data
US 2010/0228440 A1    Sep. 9, 2010

(30) Foreign Application Priority Data

Nov. 20, 2007    (JP) .................................. 2007-300932

(51) Int. Cl.
*B62D 6/00*    (2006.01)
*B62D 5/04*    (2006.01)

(52) U.S. Cl.
CPC ............ *B62D 6/008* (2013.01); *B62D 5/0466* (2013.01)

(58) Field of Classification Search
CPC ............................. B62D 6/008; B62D 5/0466
USPC ............... 701/36, 41–43; 180/402, 412, 443, 180/446–447
See application file for complete search history.

(56) References Cited

U.S. PATENT DOCUMENTS

| | | | | |
|---|---|---|---|---|
| 4,979,114 A | * | 12/1990 | Oshita et al. | ................... 701/41 |
| 5,076,381 A | * | 12/1991 | Daido et al. | .................. 180/446 |
| 5,828,973 A | * | 10/1998 | Takeuchi et al. | ............... 701/41 |
| 6,079,513 A | * | 6/2000 | Nishizaki et al. | ............ 180/402 |
| 6,239,568 B1 | * | 5/2001 | Sugitani | ................... B62D 6/00 |
| | | | | 180/410 |

(Continued)

FOREIGN PATENT DOCUMENTS

| | | |
|---|---|---|
| DE | 102 60 752 A1 | 7/2004 |
| DE | 10 2004 022 098 A1 | 11/2005 |

(Continued)

OTHER PUBLICATIONS

Office Action issued Jun. 27, 2011, in German Patent Application No. 11 2008 002 933.4 with English translation.

(Continued)

*Primary Examiner* — John Q Nguyen
*Assistant Examiner* — Michael Whalen
(74) *Attorney, Agent, or Firm* — Oblon, McClelland, Maier & Neustadt, L.L.P.

(57) ABSTRACT

A steering control apparatus includes: a friction torque setting mechanism setting a friction torque value to be applied to a steering based on information representing a status of a vehicle; a target steering angle setting mechanism setting a target steering angle based on the set friction torque value; an adding friction torque setting mechanism setting an adding friction torque based on a deviation between the set target steering angle and a steering angle; and a steering friction torque controller controlling a friction torque applied to the steering by an actuator based on the set adding friction torque.

18 Claims, 13 Drawing Sheets

(56) References Cited

U.S. PATENT DOCUMENTS

| | | | |
|---|---|---|---|
| 6,496,762 B2 * | 12/2002 | Kurishige et al. | 701/41 |
| 6,598,699 B2 | 7/2003 | Takehara et al. | |
| 6,728,615 B1 * | 4/2004 | Yao et al. | 701/41 |
| 6,736,236 B2 * | 5/2004 | Kurishige et al. | 180/446 |
| 6,925,371 B2 * | 8/2005 | Yasui et al. | 701/72 |
| 6,931,313 B2 * | 8/2005 | Kato et al. | 701/41 |
| 7,275,617 B2 * | 10/2007 | Endo et al. | 180/402 |
| 7,676,309 B2 * | 3/2010 | Tamaki et al. | 701/41 |
| 8,046,131 B2 | 10/2011 | Tanaka et al. | |
| 2002/0005314 A1 * | 1/2002 | Takehara et al. | 180/443 |
| 2002/0013647 A1 * | 1/2002 | Kawazoe et al. | 701/41 |
| 2002/0125063 A1 * | 9/2002 | Kurishige et al. | 180/443 |
| 2003/0051560 A1 * | 3/2003 | Ono et al. | 73/862.08 |
| 2003/0213641 A1 * | 11/2003 | Nakano et al. | 180/446 |
| 2004/0019417 A1 * | 1/2004 | Yasui et al. | 701/36 |
| 2004/0079578 A1 * | 4/2004 | Kurishige et al. | 180/446 |
| 2005/0121252 A1 * | 6/2005 | Tsuchiya | 180/446 |
| 2005/0209751 A1 | 9/2005 | Kato | |
| 2006/0006021 A1 | 1/2006 | Takimoto et al. | |
| 2006/0042860 A1 * | 3/2006 | Endo | B62D 6/008 180/412 |
| 2007/0144824 A1 * | 6/2007 | Tamaki | B62D 5/0463 180/446 |
| 2008/0189014 A1 | 8/2008 | Tanaka et al. | |
| 2010/0228440 A1 | 9/2010 | Yamazaki | |
| 2010/0268421 A1 * | 10/2010 | Yang et al. | 701/41 |
| 2011/0209939 A1 * | 9/2011 | Ono | B62D 5/008 180/447 |
| 2011/0218708 A1 * | 9/2011 | Ono | B62D 6/008 701/42 |

FOREIGN PATENT DOCUMENTS

| | | | |
|---|---|---|---|
| DE | 10 2005 032 037 A1 | 2/2006 | |
| DE | 10 2006 050 506 A1 | 4/2008 | |
| DE | 60 2005 001 790 T2 | 4/2008 | |
| JP | 2000-62632 A | 2/2000 | |
| JP | 2001 106105 | 4/2001 | |
| JP | 2002-87309 | 3/2002 | |
| JP | 2002 104210 | 4/2002 | |
| JP | 2002104210 A * | 4/2002 | |
| JP | 2003 285755 | 10/2003 | |
| JP | 2006 175982 | 7/2006 | |
| JP | 2006175982 A * | 7/2006 | |
| JP | 2006-224750 | 8/2006 | |
| JP | 2006-231947 | 9/2006 | |
| JP | 2007 69757 | 3/2007 | |
| JP | 3901928 | 4/2007 | |
| JP | 2007 513008 | 5/2007 | |
| JP | 2009-126244 | 6/2009 | |
| JP | WO 2010073371 A1 * | 7/2010 | B62D 6/007 |
| JP | WO 2010073373 A1 * | 7/2010 | B62D 6/008 |

OTHER PUBLICATIONS

Office Action issued on Sep. 20, 2011 in the corresponding Japanese Patent Application No. 2007-300932 (with English Translation).

Notice of Allowance issued in U.S. Appl. No. 13/127,399 on Mar. 25, 2015.

Office Action mailed Nov. 6, 2014, in co-pending U.S. Appl. No. 13/127,399.

Office Action mailed Oct. 23, 2013, in co-pending U.S. Appl. No. 13/127,399.

* cited by examiner

STEERING CONTROL APPARATUS AND A STEERING APPARATUS USING THE SAME

TECHNICAL FIELD

The present invention relates to a steering control apparatus for controlling a friction torque applied to the steering and a steering apparatus using the same.

BACKGROUND ART

Japanese Patent No 3901928 (referred to as '928 patent, hereafter) discloses a controller for an electric power steering device comprising controlling means for controlling driving a motor based on a motor current instruction value, said controller comprising target steering torque setting means for setting a target steering torque based on a steering torque and a vehicle speed; assist current calculating means for calculating an assist current instruction value based on a steering torque, the target steering torque and the motor current of the motor; target steering angle setting means for setting a target steering angle for returning the steering wheel back to a neutral position based on the steering angle and the vehicle speed; a target steering angular velocity setting means for setting a target steering angular velocity based on a deviation of the steering angle from the target steering angle and the vehicle speed; target converging current setting means for setting a target converging current based on a deviation of the steering angular velocity from the target steering angular velocity; and determining means for determining whether a user releases his/her hands from the steering wheel based on the steering torque, wherein the output of the target converging current of the target converging current setting means is made valid or restrained according to the determination result of the determining means, and the output is added to the assist current instruction value to generate the motor current instruction value.

According to the '928 patent, if the situation in which the user releases his/her hands from the steering wheel is detected, the target converging current set based on the deviation of the steering angle from the target steering angle for returning the steering wheel back to a neutral position is added to the assist current instruction value to generate the motor current instruction value. Thus, even under the situation in which the steering torque is not generated, a torque corresponding to the target converging current for returning the steering wheel back to a neutral position is additionally generated, which improves a capability of returning the steering wheel to the neutral position.

In order to reduce necessary power for maintaining the steering angle and improve stability in maintaining the steering angle, it is possible to mechanically apply a friction torque to a steering system. However, since an appropriate friction torque differs depending on a status of the vehicle such as a vehicle speed, a steering angle, etc., it is desirable to generate the friction torque not by means of a mechanical mechanism but by means of electric control.

With respect to this point, according to the '928 patent, the friction torque is generated using the target converging current by means of electric control, though such a situation is limited to a specific situation in which the user releases his/her hands from the steering wheel. However, since the friction torque is generated as a function of a steering velocity (steering angular velocity), it is not possible to reproduce static friction. Specifically, since the steering velocity is zero in a static state, it is not possible to generate the friction torque in such a static state. For this reason, according to the '928 patent, it is not possible to reduce the power required to maintain the steering angle and improve stability in maintaining the steering angle, and it is not possible to reduce steering pull in traveling straight forward, either.

DISCLOSURE OF INVENTION

Therefore, an object of the present invention is to provide a steering control apparatus and a steering apparatus using the same, which steering control apparatus can provide the friction torque by means of electric control in such a manner that it can reduce power required to maintain the steering angle, improve stability in maintaining the steering angle, and can reduce steering pull.

In order to achieve the aforementioned objects, the first aspect of the present invention relates to a steering control apparatus, characterized by:

friction torque setting means for setting a friction torque value (Tt) to be applied to a steering based on information representing a status of a vehicle;

target steering angle setting means for setting a target steering angle ($\theta t$) based on the set friction torque value (Tt);

adding friction torque setting means for setting an adding friction torque (Tc) based on a deviation between the set target steering angle ($\theta t$) and a steering angle ($\theta$); and steering friction torque controlling means for controlling a friction torque applied to the steering by an actuator based on the set adding friction torque (Tc).

According to the second aspect of the present invention, in the first aspect of the present invention, the information representing a status of a vehicle includes information representing a vehicle speed, and, in the friction torque setting means, the friction torque value (Tt) set when the vehicle speed is a first vehicle speed is greater than the friction torque value (Tt) set when the vehicle speed is a second vehicle speed, said second vehicle speed being lower than the first vehicle speed.

According to the third aspect of the present invention, in the first or the second aspect of the present invention, the information representing a status of a vehicle includes information representing the steering angle ($\theta$), and, in the friction torque setting means, the friction torque value (Tt) set when the steering angle ($\theta$) is a first steering angle is greater than the friction torque value (Tt) set when the steering angle ($\theta$) is a second vehicle steering angle, said second steering angle being smaller than the first steering angle.

According to the fourth aspect of the present invention, in any one of the aforementioned aspects of the present invention, in the adding friction torque setting means, the adding friction torque (Tc) is calculated by multiplying the deviation between the set target steering angle ($\theta t$) and the steering angle ($\theta$) by a gain.

According to the fifth aspect of the present invention, in the fourth aspect of the present invention, the steering control apparatus further comprises filtering means for calculating a filtered adding friction torque (Tcf) by low-pass filtering the adding friction torque (Tc) obtained by multiplying the deviation by the gain, and the steering friction torque controlling means controls the friction torque based on the filtered adding friction torque (Tcf) instead of the set adding friction torque (Tc).

According to the sixth aspect of the present invention, in the fifth aspect of the present invention, a cutoff frequency of the low-pass filtering is set to be a fixed value which substantially corresponds to a yaw resonance frequency of the vehicle or is varied with the vehicle speed.

According to the seventh aspect of the present invention, in any one of the aforementioned aspects of the present invention, in the target steering angle setting means, an upper limit value of the deviation (Δ) is set based on the set friction torque value (Tt), and if an absolute value of the deviation between the set target steering angle (θt) and the steering angle (θ) is greater than the set upper limit value of the deviation (Δ), the target steering angle (θt) is changed such that the absolute value of the deviation decreases, while if the absolute value of the deviation is less than the set upper limit value of the deviation (Δ), the target steering angle (θt) remains unchanged.

According to the eighth aspect of the present invention, in the fourth or the fifth aspect of the present invention, in the target steering angle setting means, an upper limit value of the deviation (Δ) is set by dividing the set friction torque value (Tt) by the gain, and if the deviation obtained by subtracting the steering angle (θ) from the set target steering angle (θt) is greater than the set upper limit value of the deviation (Δ), the target steering angle (θt) is changed to a value (θ+Δ) obtained by adding the upper limit value of the deviation (Δ) to the steering angle (θ), if the deviation is less than a negative value (−Δ) of the set upper limit value of the deviation (Δ), the target steering angle (θt) is changed to a value (θ−Δ) obtained by subtracting the upper limit value of the deviation (Δ) from the steering angle (θ), and if an absolute value of the deviation is less than the set upper limit value of the deviation (Δ), the target steering angle (θt) remains unchanged.

The ninth aspect of the present invention relates to a steering control apparatus, characterized by:

friction torque setting means for setting a friction torque value (Tt) to be applied to a steering based on information representing a status of a vehicle;

target steering angle setting means for setting a target steering angle (θt) based on a steering angle (θ);

adding friction torque setting means for setting an adding friction torque (Tc) based on a deviation between the set target steering angle (θt) and a steering angle (θ); and steering friction torque controlling means for controlling a friction torque applied to the steering by an actuator based on the set adding friction torque (Tc), wherein, in the adding friction torque setting means, if an absolute value of the deviation between the set target steering angle (θt) and the steering angle (θ) is greater than a predetermined upper limit value of the deviation (Δ), the set friction torque value (Tt) is set as the adding friction torque (Tc), while if the absolute value of the deviation is less than the predetermined upper limit value of the deviation (Δ), a torque value less than the set friction torque value (Tt) is set as the adding friction torque (Tc).

According to the tenth aspect of the present invention, in the ninth aspect of the present invention, in the adding friction torque setting means, if the absolute value of the deviation between the set target steering angle (θt) and the steering angle (θ) is less than the predetermined upper limit value of the deviation (Δ), a torque value obtained by multiplying the deviation between the set target steering angle (θt) and the steering angle (θ) by a gain is set as the adding friction torque (Tc), said gain being a value (Tt/Δ) obtained by dividing the set friction torque value (Tt) by the predetermined upper limit value of the deviation (Δ).

According to the eleventh aspect of the present invention, in the ninth or the tenth aspect of the present invention, the steering control apparatus further comprises filtering means for calculating a filtered adding friction torque (Tcf) by low-pass filtering the set adding friction torque (Tc), and the steering friction torque controlling means controls the friction torque based on the filtered adding friction torque (Tcf) instead of the set adding friction torque (Tc).

According to the twelfth aspect of the present invention, in any one of the ninth, tenth, and eleventh aspects of the present invention, the predetermined upper limit value of the deviation (Δ) is a variable value set based on the set friction torque value (Tt).

According to the thirteenth aspect of the present invention, in any one of the ninth, tenth, eleventh aspects of the present invention, the predetermined upper limit value of the deviation (Δ) is a fixed value set by dividing the set friction torque value (Tt) by the gain.

According to the fourteenth aspect of the present invention, in any one of the ninth, tenth, eleventh, twelfth and thirteenth aspects of the present invention, in the target steering angle setting means, if the deviation obtained by subtracting the steering angle (θ) from the set target steering angle (θt) is greater than the predetermined upper limit value of the deviation (Δ), the target steering angle (θt) is changed to a value (θ+Δ) obtained by adding the upper limit value of the deviation (Δ) to the steering angle (θ), if the deviation is less than a negative value (−Δ) of the predetermined upper limit value of the deviation (Δ), the target steering angle (θt) is changed to a value (θ−Δ) obtained by subtracting the upper limit value of the deviation (Δ) from the steering angle (θ), and if an absolute value of the deviation is less than the predetermined upper limit value of the deviation (Δ), the target steering angle (θt) remains unchanged.

According to the fifteenth aspect of the present invention, in any one of the aforementioned aspects of the present invention, the steering control apparatus further comprises basic steering assist torque calculating means for calculating a target steering torque (Ta) based on a steering torque; and steering assist torque controlling means for controlling a steering assist torque applied to the steering by the actuator based on the calculated target steering torque (Ta).

The sixteenth aspect of the present invention relates to a steering apparatus, characterized by:

the steering control apparatus defined in any one of the aforementioned aspects of the present invention; and an electric power steering apparatus including the actuator to be controlled by the steering control apparatus.

The seventeenth aspect of the present invention relates to a steering control apparatus comprising:

a friction torque setting part configured to set a friction torque value (Tt) to be applied to a steering based on information representing a status of a vehicle;

a target steering angle setting part configured to set a target steering angle (θt) based on the set friction torque value (Tt);

an applied friction torque setting part configured to set an applied friction torque based on a deviation between the set target steering angle (θt) and a steering angle (Δ); and a steering friction torque controlling part configured to control a friction torque applied to the steering by an actuator based on the set adding friction torque (Tc).

According to the present invention, a steering control apparatus and a steering apparatus using the same can be obtained, which steering control apparatus can provide the friction torque by means of electric control in such a manner that it can reduce power required to maintain the steering angle, improve stability in maintaining the steering angle, and can reduce steering pull.

BRIEF DESCRIPTION OF THE DRAWINGS

These and other objects, features, and advantages of the present invention will become more apparent from the following detailed description of preferred embodiments given with reference to the accompanying drawings, in which.

Figure 1:
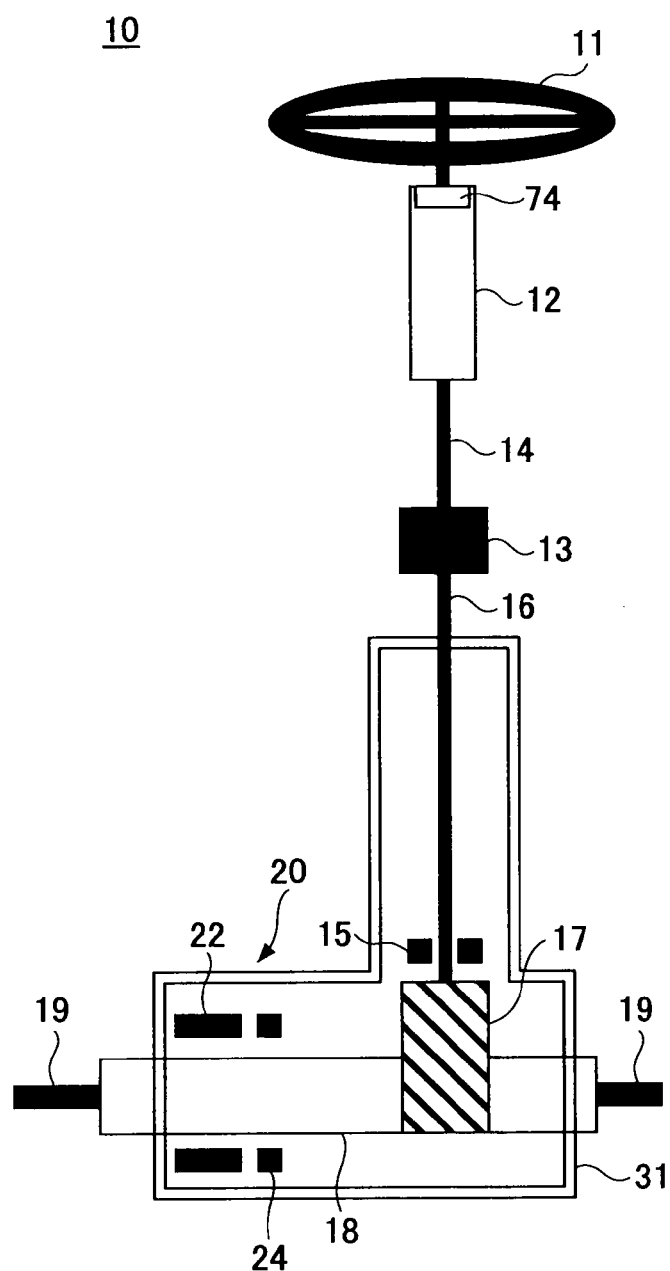
FIG. 1 is a diagram for schematically illustrating an overview of an embodiment of a steering apparatus 10 used for a vehicle according to the present invention.

EXPLANATION FOR REFERENCE NUMBER 10 steering apparatus used for a vehicle
11 steering wheel
12 steering column
13 rubber coupling
14 steering shaft
15 torque sensor
16 intermediate shaft
17 pinion
18 steering rack
19 tie rod
20 power steering apparatus
22 assist motor
24 rotation angle sensor
74 steering angle sensor
80 ECU
82 steering counter force controlling section
84 friction torque adding section

BEST MODE FOR CARRYING OUT THE INVENTION

In the following, the best mode for carrying out the present invention will be described in detail by referring to the accompanying drawings.

FIG. 1 is a diagram for schematically illustrating an overview of an embodiment of a steering apparatus used for a vehicle according to the present invention. The steering apparatus 10 has a steering column 12 including a steering wheel 11 which a driver operates. The steering column 12 rotatably supports a steering shaft 14 which corresponds to a rotation axis of the steering wheel 11. The steering shaft 14 is connected to an intermediate shaft 16 via a rubber coupling 13 or the like. The intermediate shaft 16 is connected to a pinion shaft (i.e., an output shaft) and a pinion 17 of the pinion shaft is in mesh contact with a steering rack (a steering rod) 18 within a steering gear box 31. First ends of the tie rods 19 are connected to the opposite ends of the steering rack 18, and the other ends of the tie rods 19 are connected to corresponding vehicle wheels (not shown) via knuckles or the like (not shown). Further, the intermediate shaft 16 or the steering shaft 14 is provided with a steering sensor 74 which generates a signal according to a steering angle of the steering wheel 11 and a torque sensor 15 which generates a signal according to a steering torque added to the steering shaft 14. It is noted that the torque sensor 15 may be formed of two resolvers, for example, either one of these two resolvers is provided on either one of the intermediate shaft 16 (i.e., an input shaft) and the pinion shaft (i.e., an output shaft) interconnected via a torsion bar, and detects the torque based on a deviation in rotation angle between these two shafts.

The steering apparatus 10 has a power steering apparatus 20. The power steering apparatus 20 includes, as main components, an actuator 22 (referred to as "an assist motor 22" hereafter) for assistance of steering, and a rotation angle sensor 24 for detecting a rotation angle (also referred to as "a steering motor rotation angle" hereafter). The assist motor 22 is formed of a three-phase AC motor, for example. The assist motor 22 is provided within the steering gear box 31 and is coaxial with steering rack 18. The assist motor 22 assists the movement of the steering rack 18 with the driving force thereof. The configuration of the power steering apparatus 20 itself, including its location, may be arbitrary. The assist motor 22 of the power steering apparatus 20 is controlled by an ECU 80 described below. A manner in which the assist motor 22 is controlled is described below.

Next, a primary operation of the steering apparatus 10 used for a vehicle is explained. The steering apparatus 10 includes an ECU 80 which performs various kinds of control described below. The ECU 80 is comprised mainly of a microprocessor that includes a CPU, a ROM in which control programs are stored, a RAM in which calculation results are stored, a timer, a counter, an input interface, an output interface, etc., for example.

The ECU 80 may be implemented by a single ECU which exercises control over a steering system or may be implemented in cooperation by more than two ECUs. To the ECU 80 is supplied information or data required to implement various kinds of control described below. More specifically, various sensor values are input to the ECU 80 every predetermined period from the torque sensor 15, the rotation angle sensor 24, the steering angle sensor 74, vehicle speed sensors (not shown), etc. Further, the ECU 80 is connected to a current sensor (not shown) which detects an operation current of the assist motor 22 of the power steering apparatus 20 (referred to as "an assist motor current", hereafter). The signal which represents the assist motor current is input to the ECU 80 every predetermined period. Further, the ECU 80 is connected to the power steering apparatus 20 as an object of control.

Figure 2:
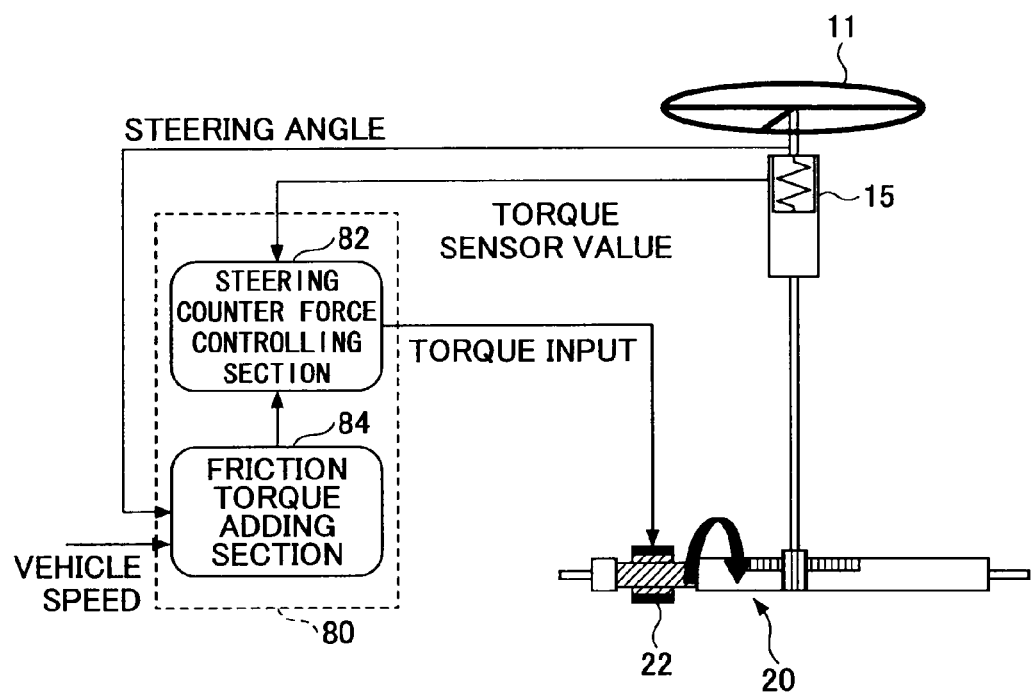
FIG. 2 is a diagram for schematically illustrating main control contents implemented by an ECU 80.

FIG. 2 is a diagram for schematically illustrating main control contents implemented by an ECU 80. The ECU 80 performs steering counter force control of a friction added type with the power steering apparatus 20. This steering counter force control of a friction added type is performed by a steering counter force controlling section 82 and a friction torque adding section 84 of the ECU 80, as schematically shown in FIG. 2.

Figure 3:
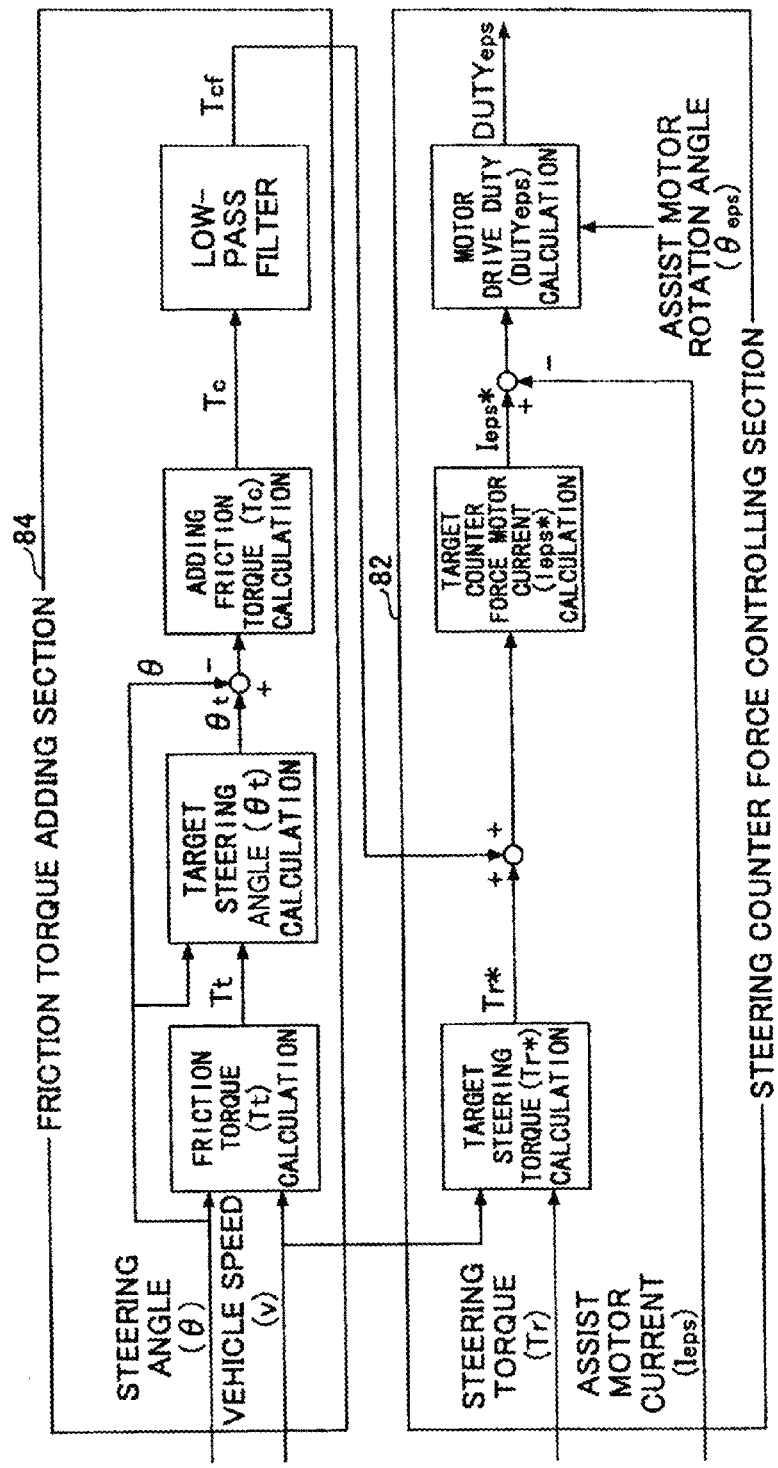
FIG. 3 is a functional block diagram of an example of a steering counter force controlling section 82 and a friction torque adding section 84 of the ECU 80.

FIG. 3 is a functional block diagram of an example of the steering counter force controlling section 82 and the friction torque adding section 84 of the ECU 80. The processes of the friction torque adding section 84 are described below.

Figure 4:
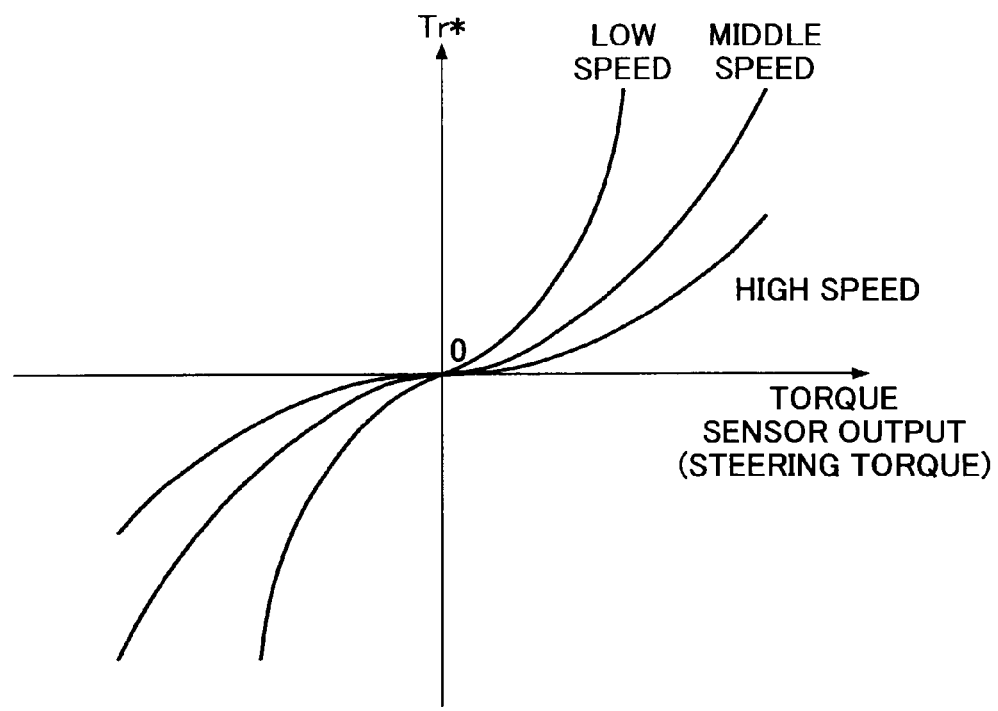
FIG. 4 is a diagram for showing an example of a map for calculating a target steering torque (Tr*) as a function of a steering torque Tr and a vehicle speed v.

In the steering counter force controlling section 82 a target steering torque (Tr*) is calculated based on the steering torque Tr input from the torque sensor 15 and the vehicle speed v input from the vehicle speed sensor, as shown in FIG. 3. The target steering torque (Tr*) may be calculated using such a map (i.e., a function) as shown in FIG. 4, for example. In this case, it is determined which range of a high speed range, a middle speed range and a low speed range the vehicle speed v belongs to, and then the target steering torque (Tr*) according to the vehicle speed is calculated using the curve corresponding to the determined speed range the vehicle speed v belongs to. It is noted that with respect to a definition of a positive or negative sign of the target steering torque (Tr*), a left turn direction of the torque is defined herein as a positive direction, for the sake of convenience. Then, a target counter force motor current (Ieps*) is calculated based on a sum of an adding friction torque (Tcf) input from the friction torque adding section 84 and the target steering torque (Tr*). It is noted that a way of calculating the adding friction torque (Tcf) adopted in the friction torque adding section 84 is described below. Then, a motor drive duty (DUTYeps) is calculated based on a deviation between an assist motor current (measured value) and the target counter force motor current (Ieps*). At this time, the motor drive duty (DUTYeps) is determined by taking an assist motor rotation angle (θeps) into consideration. The assist motor 22 of the power steering apparatus 20 is controlled according to the motor drive duty (DUTYeps) thus calculated and output. In this way, steering counter force control is implemented. It is noted that if hands of the driver are lightly in contact with the steering wheel 11, for example, or hands of the driver are off the steering wheel 11, the steering torque (Tr) and thus the target steering torque (Tr*) become zero or substantially zero. In this case, the torque generated by the assist motor 22, namely the torque applied to the steering wheel 11 corresponds to the adding friction torque input from the friction torque adding section 84.

Next, with reference to the functional block diagram of the friction torque adding section 84 shown in FIG. 3 as well as FIGS. 5-10 if necessary, a primary function of the friction torque adding section 84 is described.

In the friction torque adding section 84, at first, a friction torque Tt to be applied to the steering wheel 11 is calculated (or set) based on the steering angle θ input from the steering angle sensor and the vehicle speed v input from the vehicle speed sensor.

Figure 5:
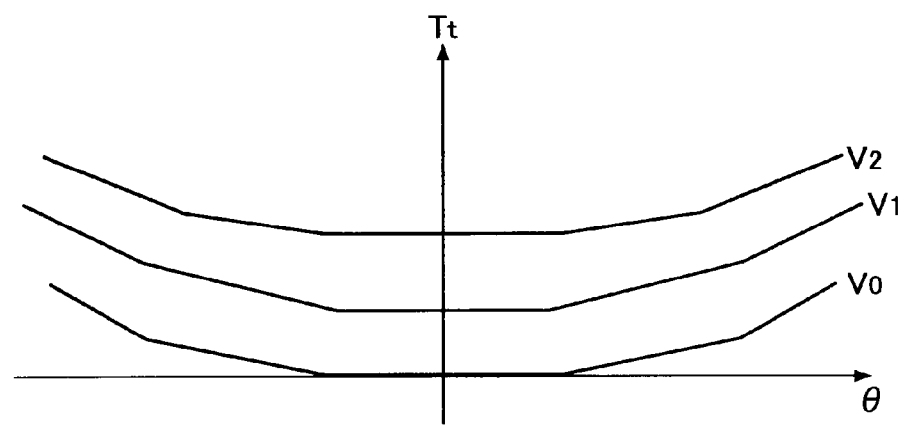
FIG. 5 is a diagram for showing an example of a map for calculating a friction torque (Tt) to be applied to a steering wheel 11 as a function of a steering angle and a vehicle speed v, and showing an example of a way of calculating the friction torque.
Figure 6:
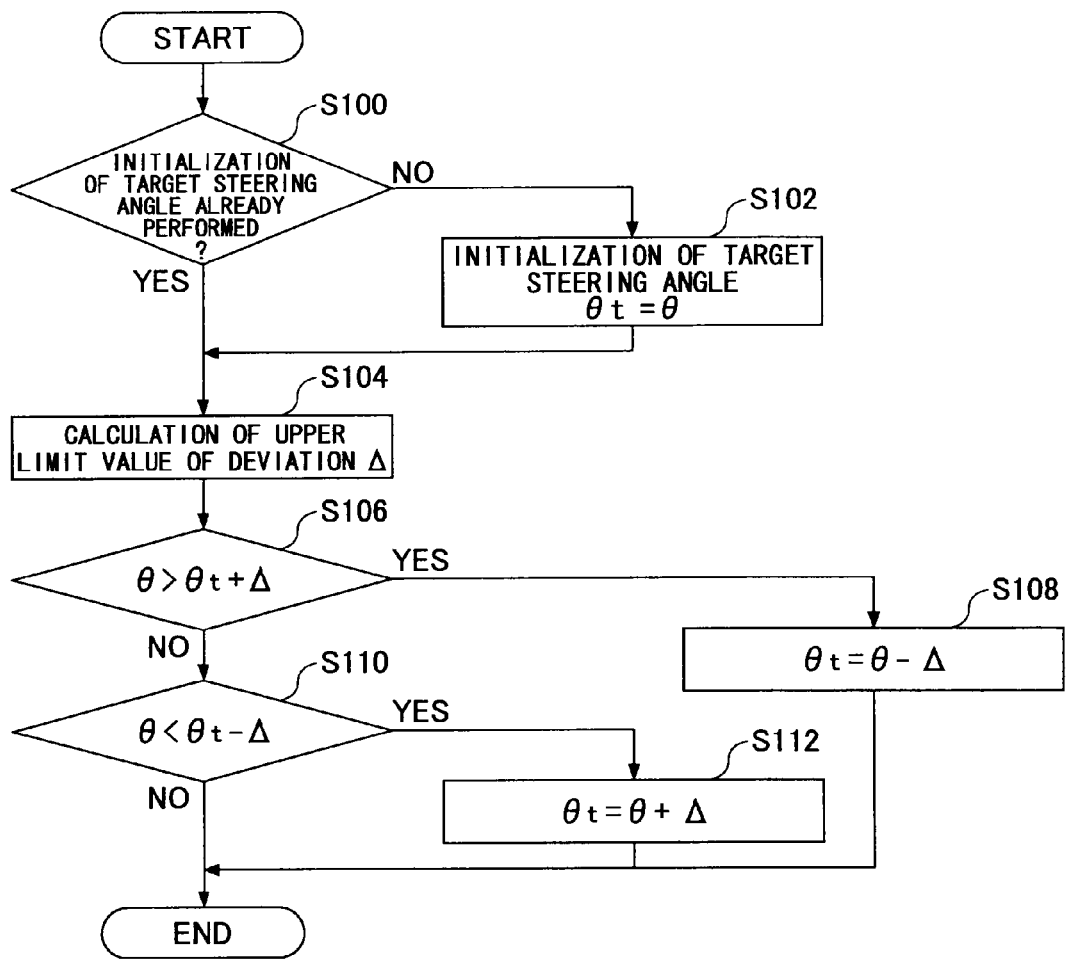
FIG. 6 is a flowchart of a preferred example of a way of calculating the target steering angle in the friction torque adding section 84.

FIG. 6 is a flowchart of a preferred example of a way of calculating the target steering angle in the friction torque adding section 84. Preferably, the friction torque Tt is calculated using a map of characteristics shown in FIG. 5. In FIG. 5, the curves of the friction torque Tt are shown with a transverse axis of the steering angle θ and an ordinate axis of the friction torque Tt, and the curves correspond to a high speed range V2, a middle speed range V1 and a low speed range V0. It is noted that with respect to a definition of a positive or negative sign of the steering angle θ, a left turn direction with respect to a nominal position (i.e., zero point of the steering angle θ) of the steering wheel 11 is defined herein as a positive direction, for the sake of convenience.

In the case of using the map shown in FIG. 5, it is determined which range of a high speed range V2, a middle speed range V1 and a low speed range V0 the vehicle speed v belongs to, and then the friction torque (Tt) according to the steering angle θ is calculated using the curve corresponding to the determined speed range the vehicle speed v belongs to. It is noted that properly speaking the friction torque (Tt) determined here is a physical quantity of magnitude only, and the direction in which it is applied (i.e., a sign, namely, in this example, a positive sign corresponding to a left turn direction and negative sign corresponding to a right turn direction) is determined at a later stage.

According to the map shown in FIG. 5, if the steering angle θ is constant, the friction torque (Tt) set when the vehicle speed is relatively high is greater than that set when the vehicle speed is relatively low. This is because in the high speed range V2 or the middle speed range V1 it is desirable to generate a relatively great friction torque (Tt) in terms of reduction of necessary power and improvement in stability in maintaining the steering angle as well as improvement in stability in traveling straight forward, while in the low speed range V0 the increased friction torque (Tt) tends to bring the driver a feeling of resistance and thus degrades a steering feeling. Further, according to the map shown in FIG. 5, if the vehicle speed is the same or is in the same vehicle speed range, the friction torque (Tt) set when the magnitude of the steering angle θ is great is greater than that set when the magnitude of the steering angle θ is small. This is because when the magnitude of the steering angle θ is great a greater transverse load tends to be generated due to the increased steered angle of the vehicle wheel and thus a greater friction torque is required in terms of reduction of the necessary power and improvement in stability in maintaining the steering angle.

In the friction torque adding section 84, a target steering angle θt is generated (or set) subsequent to the aforementioned calculation process of the friction torque Tt, as shown in FIG. 3. A way of calculating target steering angle θt in the friction torque adding section 84 may be a way shown in FIG. 6, for example. It is noted that with respect to a definition of a positive or negative sign of the target steering angle θt, a left turn direction with respect to a nominal position (i.e., zero point of the steering angle θ) is defined herein as a positive direction, for the sake of convenience FIG. 6 is a flowchart of a preferred example of a way of calculating the target steering angle in the friction torque adding section 84. It is noted that the process routine shown in FIG. 6 may be executed every predetermined period (5 ms, for example).

According to the way shown in FIG. 6, at first, in step 100, it is determined whether the target steering angle θt has been initialized, that is to say, whether this period is an initial period. If it is determined the target steering angle θt is not initialized (i.e., in the case of the negative determination in step 100), the process routine goes to step 102. On the other hand, if this period is not an initial period, that is to say, if the target steering angle θt has been initialized before the previous period (i.e., in the case of the affirmative determination in step 100), the process routine directly goes to step 104.

In step 102, an initial value of the target steering angle θ is set to be the steering angle θ (i.e., the value at this period, which is also applied hereafter). It is noted that the initial value of the target steering angle θt may be zero.

In step 104, an upper limit value of a deviation Δ is calculated. The upper limit value of the deviation Δ is calculated as follows, using the friction torque Tt calculated as mentioned above and a gain K. Δ=Tt/K. The gain K may be any fixed value determined by considering rigidity of the steering system, etc. It is noted that it is desirable that the gain K be higher than torsional rigidity of a portion whose torsional rigidity is considered to be the least in the steering system, for example. Generally, the portion corresponds to a torsion bar. It is also noted that since Tt and K are positive values, the upper limit value of the deviation Δ is a positive value.

In step 106, it is determined that the steering angle θ, the upper limit value of the deviation Δ calculated in step 104, and the current target steering angle θ meet the following relationship; θ>θt+Δ. If it is determined that θ>θt+Δ (i.e., in the case of the affirmative determination in step 106), the process routine goes to step 108. On the other hand, if it is determined that θ≤θt+Δ (i.e., in the case of the negative determination in step 106), the process routine goes to step 110.

In step 108, the target steering angle θt is changed to a new value as follows using the steering angle θ and the upper limit value of the deviation Δ calculated in step 104; θt=θ−Δ. In other words, if a deviation Δθ(=θt−θ) obtained by subtracting the steering angle θ from the target steering angle θt is less than −Δ, then the target steering angle θt is changed (i.e., updated) by θt=θ−Δ.

In step 110, it is determined that the steering angle θ (the value at this period), the upper limit value of the deviation Δ calculated in step 104, and the current target steering angle θt meet the following relationship; θ<θt−Δ. If it is determined that θ<θt−Δ (i.e., in the case of the affirmative determination in step 110), the process routine goes to step 112.

In step 112, the target steering angle θt is changed to a new value as follows using the steering angle θ and the upper limit value of the deviation Δ calculated in step 104; θt=θ+Δ. In other words, if the deviation Δθ(=t−θ) obtained by subtracting the steering angle θ from the target steering angle θt is greater than Δ, then the target steering angle θt is changed (i.e., updated) by θt=θ+Δ. It is noted that if in step 110 it is determined that θ≥θt−Δ (i.e., in the case of the negative determination in step 110), the process routine of this period terminates without doing any further process. Therefore, in this case, the current target steering angle θt remains as it is without change. In other words, if the deviation Δθ(=θt−θ) obtained by subtracting the steering angle θ from the target steering angle θt is greater than or equal to −Δ and less than or equal to Δ, then the target steering angle θt remains as it is without change.

Figure 7:
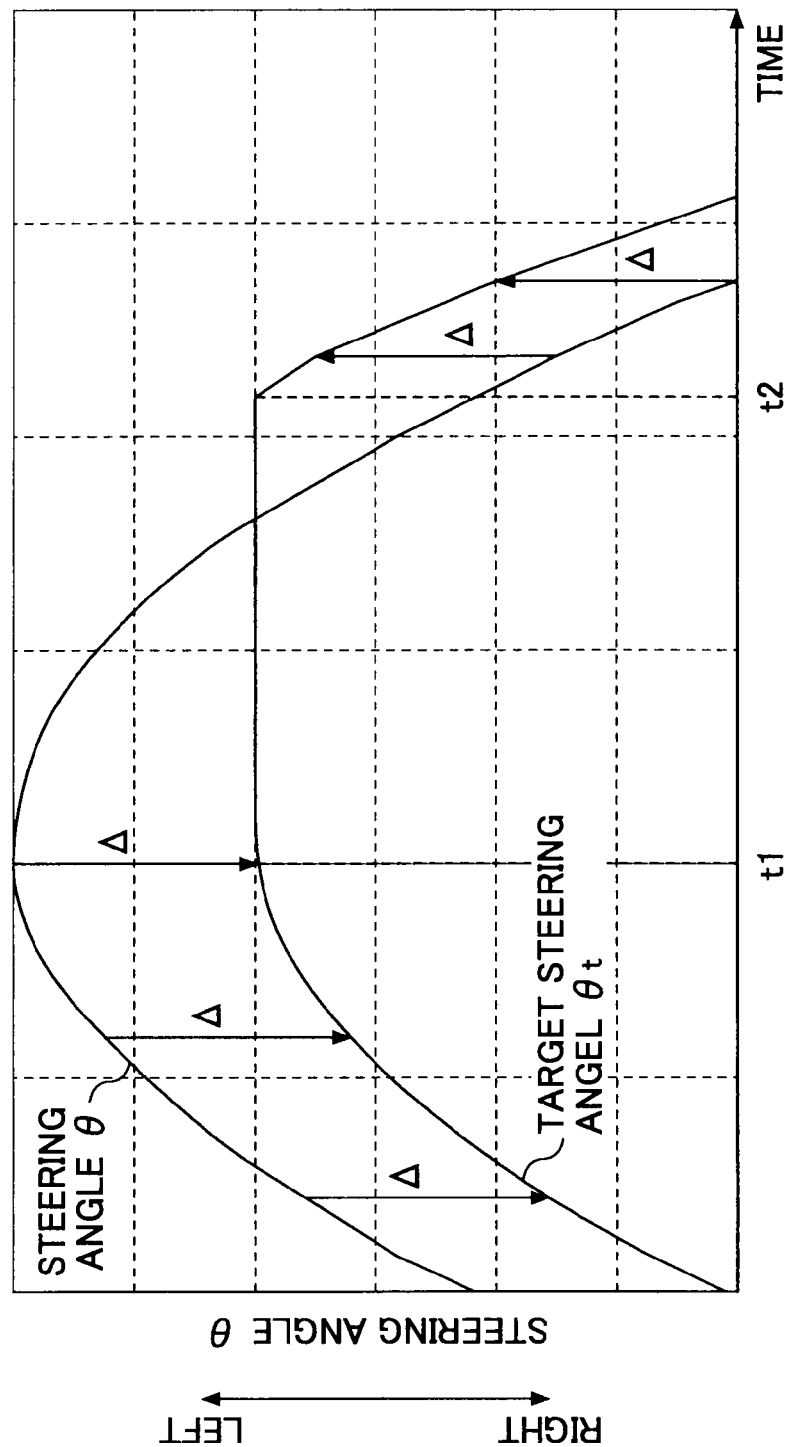
FIG. 7 is a diagram for showing an example of a relationship between a changing manner of the steering angle θ and a changing manner of a target steering angle θt in time series.

FIG. 7 is a diagram for showing an example of a relationship between a changing manner of the steering angle θ and a changing manner of a target steering angle θt in time series. According to the changing manner of the steering angle θ, the steering wheel 11 is steered left before the time t1, and then is turned right after the time t1. Correspondingly, the target steering angle θt meets the relationship of θ>θt+Δ before the time t1, and thus is changed according to the relationship of θt=θ−Δ (see step 108). Further, the target steering angle θt meets the relationship of θ≤θt+Δ and θ≥θt−Δ between the time t1 and the time t2, it remains unchanged (see negative determination in step 110). Further, the target steering angle θt meets the relationship of θ<θt+Δ after the time t2, and thus is changed according to the relationship of θt=θ+Δ (see step 112).

In the friction torque adding section 84, an adding friction torque Tc is generated (or set) subsequent to the aforementioned calculation process of the target steering angle θt, as shown in FIG. 3. With respect to a definition of a positive or negative sign of the adding friction torque Tc, a left turn direction of the torque is defined as a positive direction, as is the case with the target steering torque (Tr*).

The adding friction torque Tc is calculated by a formula of Tc=K×Δθ, namely Tc=K×(θt−θ), using the steering angle θ, the target steering angle θt calculated as mentioned above and the gain K (=Tt/Δ). It is noted that the gain K used herein is the same as the gain K which is used for the aforementioned calculation of the target steering angle (refer to the explanation as to step 104 in FIG. 6).

Figure 8:
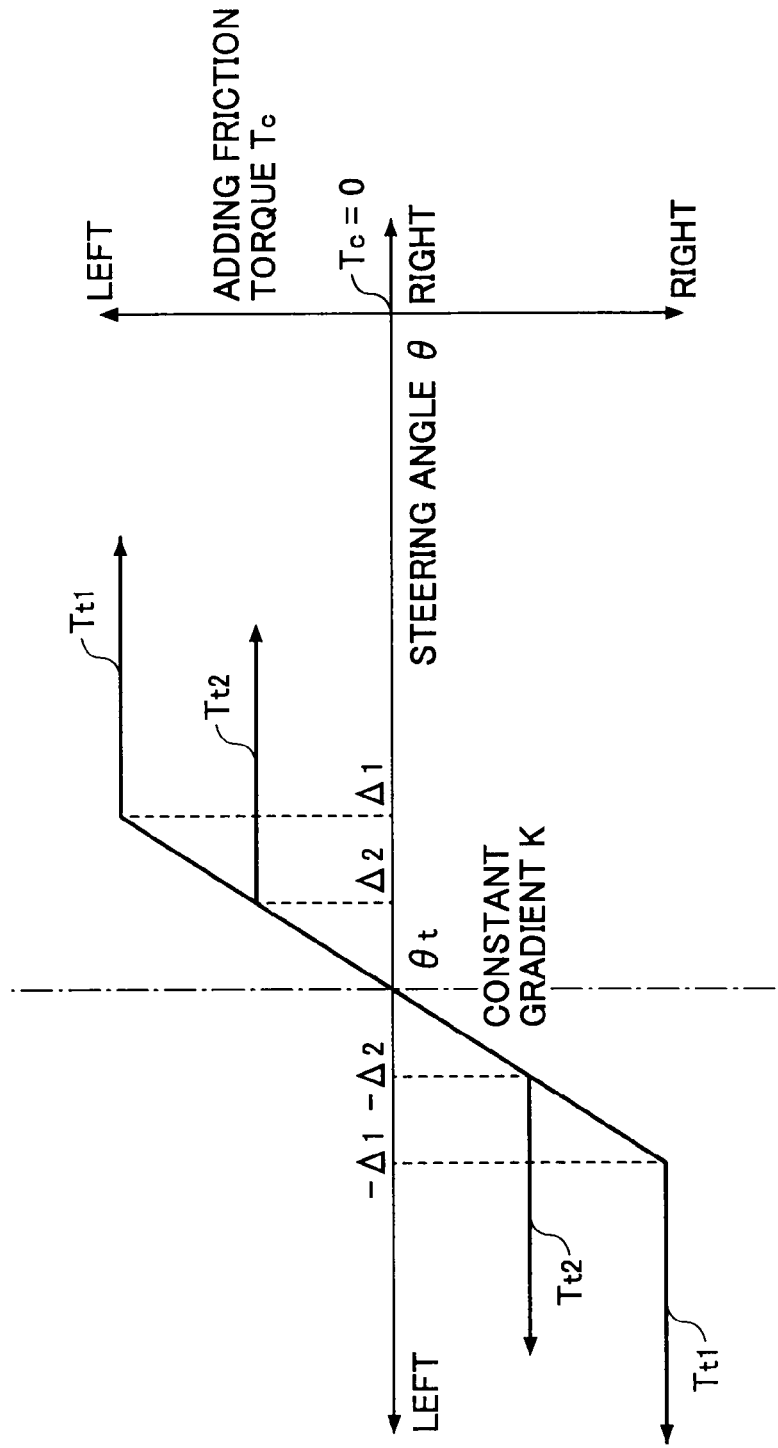
FIG. 8 is a diagram for illustrating characteristics of the calculated adding friction torque Tc.

FIG. 8 is a diagram for illustrating characteristics of the calculated adding friction torque Tc calculated as mentioned above. In FIG. 8, a transverse axis indicates the steering angle θ and an ordinate axis indicates the adding friction torque Tc. In FIG. 8, as representative examples, the case where the friction torque Tt is Tt1, and the case where the friction torque Tt is Tt2 (<Tt1) are shown. In other words, the case of the friction torque Tt1 at the high speed range V2 or middle speed range V1, and the case of the friction torque Tt2 at the low speed range V0 are shown. Further, in FIG. 8, in either case of Tt1 or Tt2, for better understanding, and for the sake of convenience, it is assumed that the target steering angle θt is the same and doesn't vary with the change of the steering angle θ. It is noted that if the target steering angle θt changes, then the graph is merely translated along the transverse axis to be centered at a new target steering angle θt.

Figure 9:
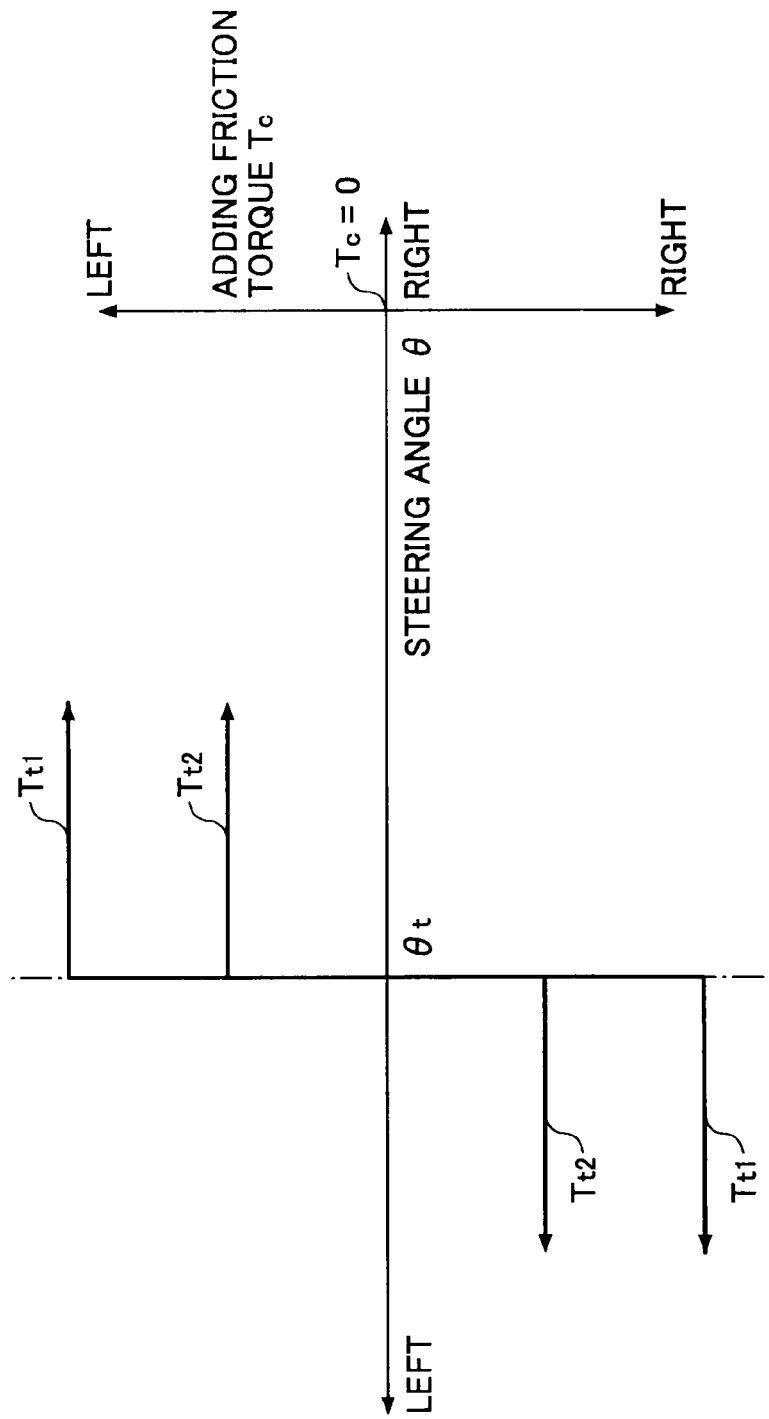
FIG. 9 is a diagram for illustrating characteristics of the adding friction torque Tc in a specific case which is equivalent to the case where a gain K is set to infinity.

As shown in FIG. 8, because of the relationship of Δ=Tt/K, the greater the friction torque Tt is, the greater the upper limit value of the deviation Δ becomes. For example, the upper limit value of the deviation Δ1 in the case of Tt1 is greater than the upper limit value of the deviation Δ2 in the case of Tt2. Further, in the range of −Δ≤Δθ≤Δ, because of the relationship of Tc=K×Δθ, namely Tc=K×(θt−θ), the magnitude of the adding friction Tc increases in proportion to Δθ. In the range of Δθ>Δ or Δθ<−Δ, the target steering angle θt is changed as mentioned above and the magnitude of Δθ is constant magnitude Δ. Thus, because of the relationship of Tc=K×Δθ and Δ=Tt/K, the magnitude of the adding friction torque Tc is a constant value corresponding to the magnitude of the friction torque Tt. In other words, in the range of −Δ≤Δθ≤Δ, the friction torque Tt to be applied to the steering wheel 11 is not actually applied to the steering wheel 11. The magnitude of the adding friction torque Tc is set to be the magnitude of the friction torque Tt to be applied to the steering wheel 11 only after an absolute value of Δθ is greater than the upper limit value of the deviation Δ. This is because if the magnitude of the adding friction torque Tc is set to be the magnitude of the friction torque Tt to be applied to the steering wheel 11 even in the range of −Δ≤Δθ≤Δ, as shown in FIG. 9, the friction torque becomes to easily able to vibrate too sensitively, which degrades the steering feeling. It is noted that the characteristics shown in FIG. 9 are the same as those in the case where the gain K is set to infinity.

Figure 10:
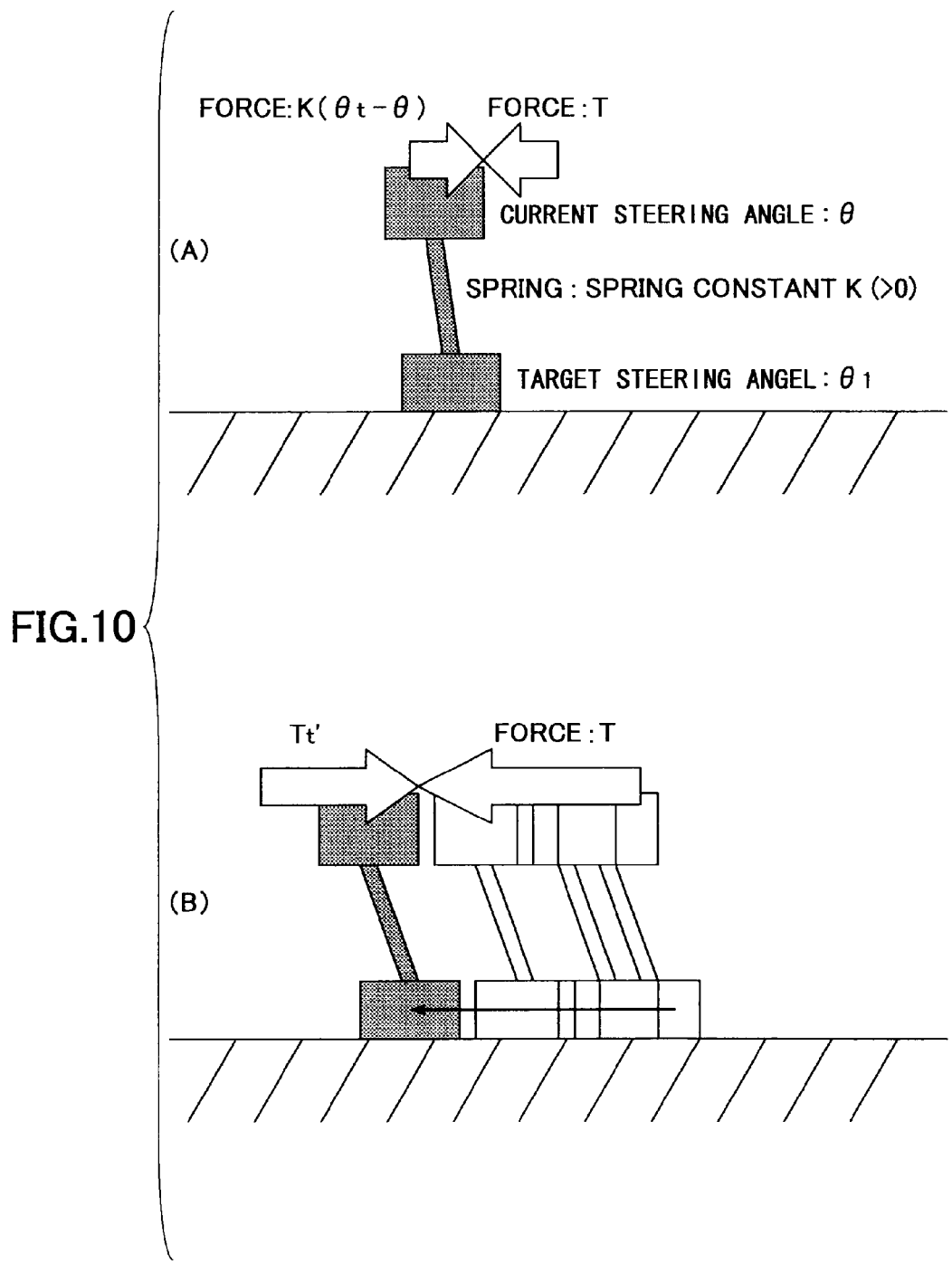
FIG. 10 is a diagram of a model for visualizing characteristics of the adding friction torque Tc.

FIG. 10 is an image diagram of a model for visualizing characteristics of the adding friction torque Tc. FIG. 10 (A) corresponds to the range of $-\Delta \leq \Delta\theta \leq \Delta$. In this case, the target steering angle $\theta t$ doesn't change, and a force which is proportional to a force T (for example, an external force generated due to an input to the vehicle wheel), that is to say, an elastic force generated when a spring with a spring constant K (=gain K) deforms by an amount of deformation ($\theta t-\theta$) is generated. FIG. 10 (B) corresponds to the range of $\Delta\theta > \Delta$ or $\Delta\theta < -\Delta$. In this case, the target steering angle $\theta t$ changes in a direction in which the force T is applied, and a constant friction force Tt' (which is less than the force T) in an opposite direction with respect to the force T is generated. It is noted that the friction force Tt' corresponds to a value obtained by converting the friction torque Tt into a force dimension.

In the friction torque adding section 84, preferably, the adding friction torque Tc is filtered with a low-pass filter subsequent to the aforementioned calculation process of the adding friction torque Tc, as shown in FIG. 3. Here, the filtered adding friction torque Tc is indicated by a symbol Tcf. The low-pass filter may be a first-order low-pass filter as follows, or may be a different type (for example, the order may be increased).

$$Tcf=1/(fc \times s+1) \times Tc$$

Here, fc indicates a cutoff frequency and is desired to be a fixed or variable value within a range between about 1 Hz and about 2 Hz. This is because a yaw resonance frequency of the vehicle exists in such a range of the frequency, and thus the variation in a friction torque is adequately filtered, which improves the steering feeling. It is noted that since the yaw resonance frequency of the vehicle varies with the vehicle speed, the cutoff frequency fc may be varied according to the vehicle speed. Alternatively, as a simple example, the cutoff frequency fc may be a fixed value which corresponds to the yaw resonance frequency of the vehicle at a representative vehicle speed (for example, 80 km/h).

It is noted that the calculation process of the adding friction torque Tc and the low-pass filtering process in the friction torque adding section 84 may be executed every calculation period which is the same as the calculation period used for calculating the target steering angle $\theta t$. However, preferably, the calculation process of the adding friction torque Tc and the low-pass filtering process in the friction torque adding section 84 is executed every calculation period which is substantially shorter than the calculation period used for calculating the target steering angle $\theta t$, considering responsiveness, etc. For example, if the calculation period for calculating the target steering angle $\theta t$ is 5 ms, the calculation period for calculating the adding friction torque Tc (and Tcf) may be 400 µs.

In this way, the adding friction torque Tcf output from the friction torque adding section 84 is input to the steering counter force controlling section 82, as described above and shown in FIG. 3. In the steering counter force controlling section 82, the adding friction torque Tcf is added to the steering wheel 11 by means of the assist motor 12 as described above.

According to the present embodiment described above, the following effect among others can be obtained.

According to the present embodiment, as mentioned above, the adding friction torque Tc or Tcf is generated in an electric control manner. Therefore, it is possible to generate the adding friction torque Tc of optimal magnitude in an optimal direction according to the status of the vehicle such as a vehicle speed v and a steering angle $\theta$. For example, it is possible to implement reduction of necessary power and improvement in stability in maintaining the steering angle as well as improvement in stability in traveling straight forward, by generating a relatively high adding friction torque in a middle or high speed range while generating an adding friction torque in a low speed range in such a manner that the friction feeling is reduced. Further, according to the present embodiment, it is possible to generate an optimal adding friction torque in a manner irrespective of the steering torque Tr (i.e., in a manner irrespective of the assist torque control). Further, since the adding friction torque according to the deviation between the steering angle $\theta$ and the target steering angle $\theta t$ is generated, it is possible to generate the adding friction torque even during the time period in which the steering angle $\theta$ does not change substantially (i.e., even during the time period in which steering speed is substantially zero). Therefore, it is possible to reproduce static friction and implement reduction of a necessary power and improvement in stability in maintaining the steering angle. Further, it is possible to implement smooth and vibration-free (i.e., free from abnormal feeling) friction characteristics as shown in FIG. 8 by appropriately changing the target steering angle $\theta t$ according to the deviation between the steering angle $\theta$ and the target steering angle $\theta t$ as shown in FIG. 6. Further, it is possible to improve a steering keeping ability at any steering position not limited to the nominal position by appropriately changing the target steering angle $\theta t$ according to the deviation between the steering angle $\theta$ and the target steering angle $\theta t$ as shown in FIG. 6.

Here, experiment results which show an example of effects obtained according to the present embodiment are described.

Figure 11:
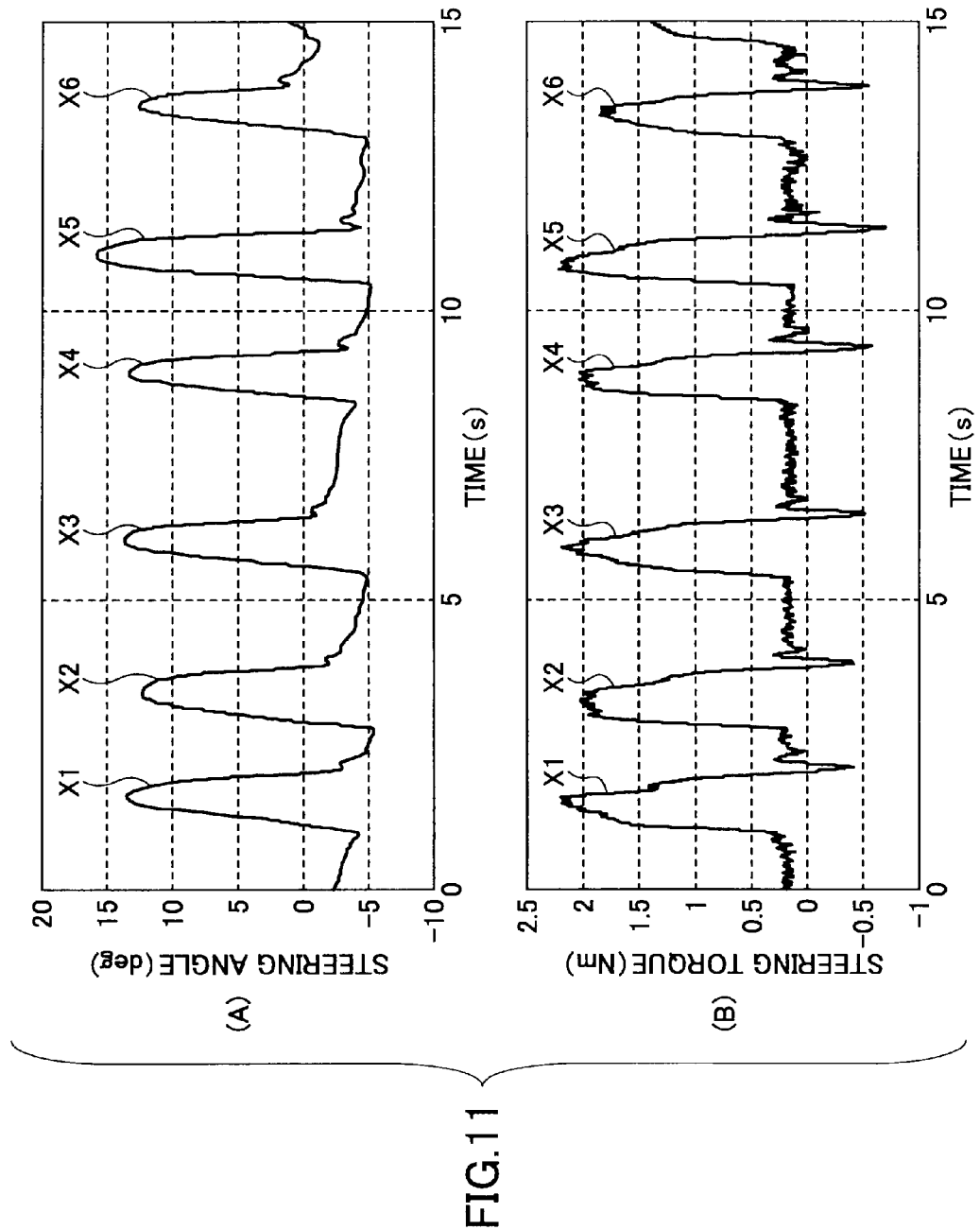
FIG. 11 is a diagram showing traveling experiment results according to a prior art configuration.

FIG. 11 is a diagram showing traveling experiment results according to a prior art configuration which does not have the friction torque adding section 84, where FIG. 11 (A) shows a time series of a variation of the steering angle $\theta$ and FIG. 11 (B) shows a time series of a variation of the steering torque Tr. This prior art configuration corresponds to a configuration in which the adding friction torque Tcf input to the steering counter force controlling section 82 is always zero in FIG. 3. In this traveling experiment, the vehicle traveled at the speed of 60 km/h on the road whose surface was inclined in a right direction. This road had such inclination characteristics that the inclination to the right decreased gradually. The driver drove the vehicle so as to keep traveling straight forward while inputting as small steering torque as possible (i.e., with hands off status).

According to the prior art configuration, as shown in FIG. 11, when the steering torque was relieved, the steering pull to the right direction due to the road surface inclination to the right occurred and thus the steering angle $\theta$ changed to the right direction (i.e., the negative direction). For this reason, it was found that total six times of steering operations to the left direction, as indicated by X1-X6, were necessary in order to keep traveling straight forward.

Figure 12:
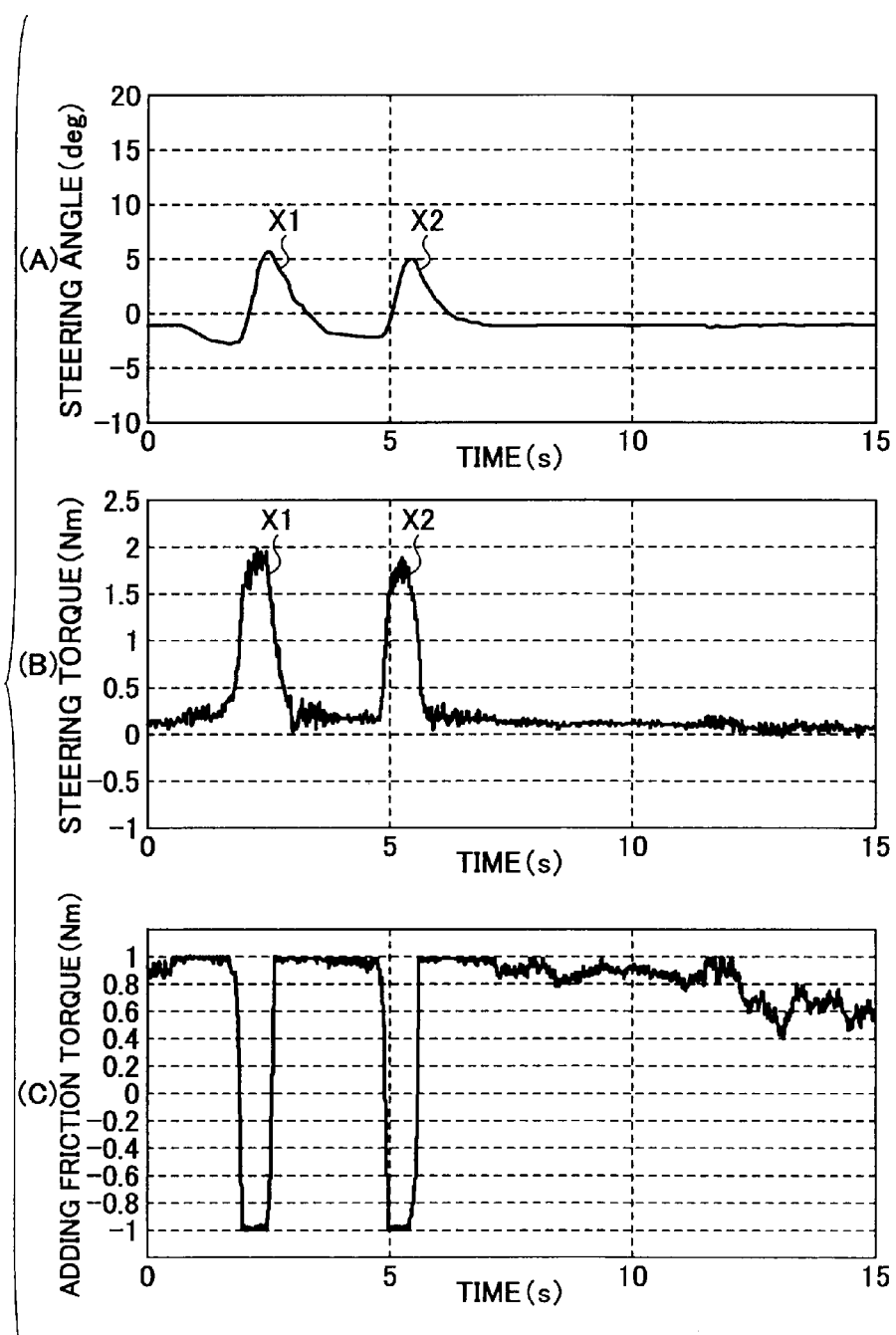
FIG. 12 is a diagram showing traveling experiment results according to the present embodiment.

FIG. 12 is a diagram showing traveling experiment results according to the present embodiment, where FIG. 12 (A) shows a time series of a variation of the steering angle $\theta$, FIG. 12 (B) shows a time series of a variation of the steering torque Tr, and FIG. 12 (C) shows a time series of a variation of the adding friction torque Tcf. The experiment conditions such as inclination of the road, the traveling section, etc., were the same as those in the case of the experiment results shown in FIG. 11.

According to the present embodiment, in the first half of the traveling section, as shown in FIG. 12, when the steering torque was relieved, the steering pull to the right direction due to the road surface inclination to the right occurred and thus the steering angle θ changed to the right direction (i.e., the negative direction). For this reason, it was found that total two times of steering operations to the left direction, as indicated by X1 and X2, were necessary in order to keep traveling straight forward. However, according to the present embodiment, the adding friction torque Tcf worked to the left direction while the steering torque was relieved as shown in FIG. 12 (C). Thus, the steering pull to the right direction was reduced, and a smaller modified steering torque and a smaller modified steering angle were sufficient with respect to the case of the prior art configuration shown in FIG. 11. Further, according to the present embodiment, in the second half of the traveling section in which the inclination of the road surface is reduced to some extent, it was found that the steering pull to the right direction was completely reduced thanks to the effects of the adding friction torque and thus the modified steering torque and the modified steering angle became unnecessary even when the steering torque was relieved.

Next, as a variant of the aforementioned embodiment (referred to as "a first embodiment" hereafter), another embodiment (referred to as "a second embodiment" hereafter) is described.

The second embodiment differs from the first embodiment mainly in that the upper limit value of the deviation Δ is a predetermined fixed value and instead of it the gain K is a variable value. In the following, an arrangement unique to the second embodiment is described intensively, but other elements may be the same as those in the above first embodiment.

Figure 13:
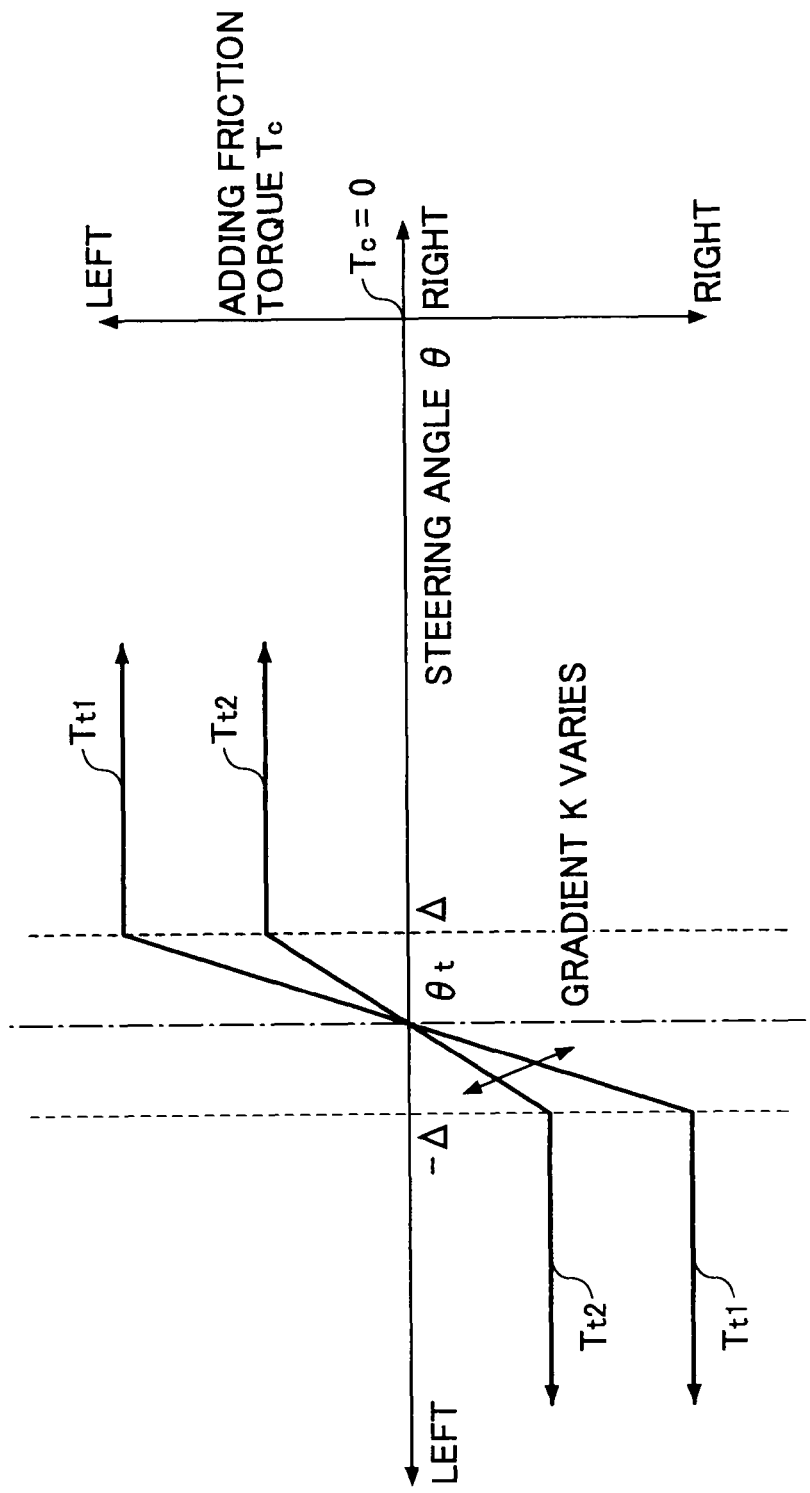
FIG. 13 is a diagram for illustrating characteristics of the adding friction torque Tc implemented according to the second embodiment.

FIG. 13 is a diagram for illustrating characteristics of the adding friction torque Tc implemented according to the second embodiment, and is comparable to FIG. 8 according to the first embodiment. In the second embodiment, as shown in FIG. 13, the upper limit value of the deviation Δ is a predetermined fixed value and the gain K is varied. It is noted that the relationship between the gain K and the upper limit value of the deviation Δ is expressed as Δ=Tt/K, as is the case with the first embodiment. Thus, in the second embodiment, the greater the friction torque Tt is, the greater the gain K becomes. Consequently, in the range of −Δ≤Δθ≤Δ, the variation in the adding friction torque Tc with respect to the same Δθ becomes greater as the friction torque Tt becomes greater. It is noted that in the range of Δθ>Δ or Δθ<−Δ, the magnitude of the adding friction torque Tc is equal to the magnitude of the friction torque Tt and is constant, as is the case with the first embodiment. However, since the upper limit value of the deviation Δ is a fixed value, the ranges of Δθ>Δ and Δθ<−Δ are fixed regardless of the friction torque Tt. In those ranges the magnitude of the adding friction torque Tc is equal to the magnitude of the friction torque Tt and is constant.

It is noted that in the second embodiment only a way of calculating the target steering angle θt and a way of calculating the adding friction torque Tc are different from those in the first embodiment, and thus the way of calculating the friction torque Tt and the process of the low-pass filter may be the same as those in the first embodiment. Below, only the way of calculating the target steering angle θ and the way of calculating the adding friction torque Tc are explained.

Figure 14:
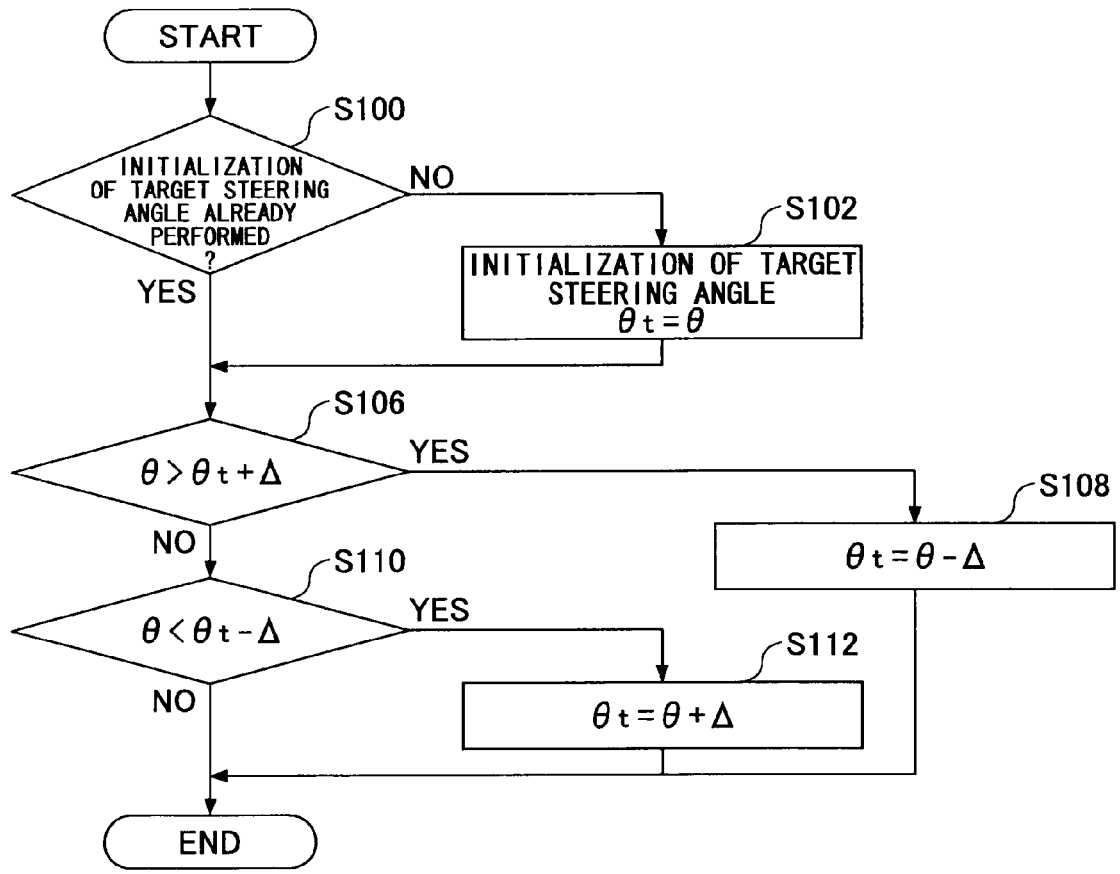
FIG. 14 is a flowchart of a preferred example of a way of calculating the target steering angle according to the second embodiment.

FIG. 14 is a flowchart of a preferred example of the way of calculating the target steering angle according to the second embodiment. The way of calculating the target steering angle shown in FIG. 14 differs from the way of calculating the target steering angle according to the first embodiment shown in FIG. 6 in that the process of step 104 is omitted. In other words, since in the second embodiment the upper limit value of the deviation Δ is a predetermined fixed value, it is not necessary to calculate the upper limit value of the deviation Δ according to the friction torque Tt, and thus the predetermined fixed value is used as it is in steps 106-112.

Figure 15:
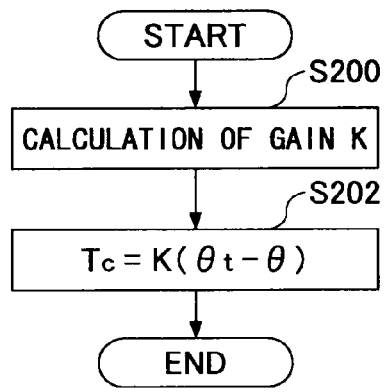
FIG. 15 is a flowchart of an example of a way of calculating the adding friction torque Tc according to the second embodiment.

FIG. 15 is a flowchart of an example of the way of calculating the adding friction torque Tc according to the second embodiment.

In step 200, the gain K is calculated (or set). The gain K is calculated as follows, using the friction torque Tt calculated as mentioned before and the upper limit value of the deviation Δ (a fixed value). K=Tt/Δ.

In step 202, the adding friction torque Tc is calculated by a formula of Tc=K×Δθ, namely Tc=K×(θt−θ), using the steering angle θ, the target steering angle θ and the gain K set in step 200.

According to the second embodiment, substantially the same effects as those in the first embodiment can be obtained. However, in the second embodiment, if the gain K is too great, a vibration can occur easily. Therefore, it is desirable to appropriately determine the upper limit value of the deviation Δ so as not to generate such a vibration.

It is noted that in the respective embodiments "steering friction torque controlling means" and "steering friction torque controlling means" are implemented integrally by the steering counter force controlling section 82.

The present invention is disclosed with reference to the preferred embodiments. However, it should be understood that the present invention is not limited to the above-described embodiments, and variations and modifications may be made without departing from the scope of the present invention.

For example, although in the above-described embodiments the magnitude of the adding friction torque Tc increases in proportion to the increase in the absolute value of Δθ in the range of −Δ≤Δθ≤Δ a preferred embodiment, this is not essential. For example, in the range of −Δ≤Δθ≤Δ the magnitude of the adding friction torque Tc may increase in a nonlinear manner with respect to the increase in the absolute value of Δθ. Alternatively, in the range of −Δ≤Δθ≤Δ the magnitude of the adding friction torque Tc may be a constant value irrespective of no. In this case, the constant value is less than the friction torque Tt and may be zero.

Further, in the foregoing the proffered way of setting the target steering angle θ is described; however, the target steering angle θ may be set (or calculated) by other ways. For example, the previous value of the steering angle θ, the steering angle θ before the predetermined period, or an average value obtained by averaging values of the steering angle θ over the predetermined preceding periods may be set as the target steering angle θ every predetermined period.

Further, although in the above-described embodiments the friction torque Tt is set based on two parameters, that is to say, based on the vehicle speed v and the steering angle θ as a preferred embodiment, the friction torque Tt may be set based on any one of these parameters. Further, although in the above-described embodiments the adding friction torque Tcf obtained through a low-pass filtering process is used as a preferred embodiment, such a low-pass filtering process may be omitted. Further, an average value obtained by averaging values of the adding friction torque Tcf over a predetermined number of periods may be used.

Further, although in the above-described embodiments the friction torque is added to the steering system by means of electric control and the friction torque is not positively added to the steering system by means of a mechanical mechanism as a preferred embodiment, it is also possible to combine with a configuration in which the friction torque is added to the steering system by means of a mechanical mechanism as long as an effect of the friction torque added by means of the mechanical mechanism is substantially small.

The present application is based on Japanese Priority Application No. 2007-300932, filed on Nov. 20, 2007, the entire contents of which are hereby incorporated by reference.

The invention claimed is:

1. A steering control apparatus comprising:
a friction torque setting means for setting a friction torque value (Tt) based on information representing a status of a vehicle;
a target steering angle setting means for setting a target steering angle (θt);
an adding friction torque setting means for setting an adding friction torque (Tc) at least at a time when the target steering angle (θt) is not zero, based on a deviation between the set target steering angle (θt) and a steering angle (θ); and
a steering friction torque controlling means for controlling a friction torque applied to a steering element by an actuator based on the set adding friction torque (Tc)
wherein the target steering angle setting means is configured to set the target steering angle (Θt) based on the friction torque value (Tt); and
wherein
the information representing the status of the vehicle includes information representing the steering angle (Θ), and
in the friction torque setting means, the friction torque value (Tt) set when the steering angle (η) is a first steering angle is greater than the friction torque value (Tt) set when the steering angle (η) is a second vehicle steering angle, said second steering angle being smaller than the first steering angle.

2. A steering control apparatus comprising:
a friction torque setting part configured to set a friction torque value (Tt) based on information representing a status of a vehicle;
a target steering angle setting part configured to set a target steering angle (θt);
an adding friction torque setting part configured to set an adding friction torque (Tc) at least at a time when the target steering angle (θt) is not zero, based on a deviation between the set target steering angle (θt) and a steering angle (θ); and
a steering friction torque controlling part configured to control a friction torque applied to a steering element by an actuator based on the set adding friction torque (Tc)
wherein the target steering angle setting part is configured to set the target steering angle (Θt) based on the friction torque value (Tt); and
wherein
the information representing the status of the vehicle includes information representing the steering angle (Θ), and
in the friction torque setting part, the friction torque value (Tt) set when the steering angle (Θ) is a first steering angle is greater than the friction torque value (Tt) set when the steering angle (Θ) is a second vehicle steering angle, said second steering angle being smaller than the first steering angle.

3. The steering control apparatus as claimed in claim 2, wherein
the information representing the status of the vehicle includes information representing a vehicle speed, and
in the friction torque setting part, the friction torque value (Tt) set when the vehicle speed is a first vehicle speed is greater than the friction torque value (Tt) set when the vehicle speed is a second vehicle speed, said second vehicle speed being lower than the first vehicle speed.

4. The steering control apparatus as claimed in claim 2, wherein, in the adding friction torque setting part, the adding friction torque (Tc) is calculated by multiplying the deviation between the set target steering angle (θt) and the steering angle (θ) by a gain.

5. The steering control apparatus as claimed in claim 4, further comprising a filtering part configured to calculate a filtered adding friction torque (Tcf) by low-pass filtering the adding friction torque (Tc) obtained by multiplying the deviation by the gain,
wherein the steering friction torque controlling part controls the friction torque based on the filtered adding friction torque (Tcf) instead of the set adding friction torque (Tc).

6. The steering control apparatus as claimed in claim 5, wherein a cutoff frequency of the low-pass filtering is set to a fixed value which substantially corresponds to a yaw resonance frequency of the vehicle or is varied with the vehicle speed.

7. The steering control apparatus as claimed in claim 4, wherein, in the target steering angle setting part, an upper limit value of the deviation (Δ) is set by dividing the set friction torque value (Tt) by the gain, and if the deviation obtained by subtracting the steering angle (θ) from the set target steering angle (θt) is greater than the set upper limit value of the deviation (Δ), the target steering angle (θt) is changed to a value (θ+Δ) obtained by adding the upper limit value of the deviation (Δ) to the steering angle (θ), if the deviation is less than a negative value (−Δ) of the set upper limit value of the deviation (Δ), the target steering angle (θt) is changed to a value (θ−Δ) obtained by subtracting the upper limit value of the deviation (Δ) from the steering angle (θ), and if an absolute value of the deviation is less than the set upper limit value of the deviation (Δ), the target steering angle (θt) remains unchanged.

8. The steering control apparatus as claimed in claim 2, wherein, in the target steering angle setting part, an upper limit value of the deviation (Δ) is set based on the set friction torque value (Tt), and if an absolute value of the deviation between the set target steering angle (θt) and the steering angle (θ) is greater than the set upper limit value of the deviation (Δ), the target steering angle (θt) is changed such that the absolute value of the deviation decreases, while if the absolute value of the deviation is less than the set upper limit value of the deviation (Δ), the target steering angle (θt) remains unchanged.

9. The steering control apparatus as claimed in claim 2, further comprising:
a basic steering assist torque calculating part configured to calculate a target steering torque (Ta) based on a steering torque; and a steering assist torque controlling part configured to control a steering assist torque applied to the steering by the actuator based on the calculated target steering torque (Ta).

10. The steering control apparatus of claim 2, wherein
the target steering angle setting part is configured to set the target steering angle (θt) based on the steering angle (θ), and
wherein, in the adding friction torque setting part, if an absolute value of the deviation between the set target steering angle (θt) and the steering angle (θ) is greater than a predetermined upper limit value of the deviation (Δ), the set friction torque value (Tt) is set as the adding friction torque (Tc), while if the absolute value of the deviation is less than the predetermined upper limit value of the deviation (Δ), a torque value less than the set friction torque value (Tt) is set as the adding friction torque (Tc).

11. The steering control apparatus as claimed in claim 10, wherein, in the adding friction torque setting part, if the absolute value of the deviation between the set target steering angle (θt) and the steering angle (θ) is less than the predetermined upper limit value of the deviation (Δ), a torque value obtained by multiplying the deviation between the set target steering angle (θt) and the steering angle (θ) by a gain is set as the adding friction torque (Tc), said gain being a value (Tt/Δ obtained by dividing the set friction torque value (Tt) by the predetermined upper limit value of the deviation (Δ).

12. The steering control apparatus as claimed in claim 10, further comprising a filtering part configured to calculate a filtered adding friction torque (Tcf) by low-pass filtering the set adding friction torque (Tc),
wherein the steering friction torque controlling part controls the friction torque based on the filtered adding friction torque (Tcf) instead of the set adding friction torque (Tc).

13. The steering control apparatus as claimed in claim 10, wherein the predetermined upper limit value of the deviation (Δ) is a variable value set based on the set friction torque value (Tt).

14. The steering control apparatus as claimed in claim 10, wherein the predetermined upper limit value of the deviation (Δ) is a fixed value set by dividing the set friction torque value (Tt) by the gain.

15. The steering control apparatus as claimed in claim 10, wherein, in the target steering angle setting part, if the deviation obtained by subtracting the steering angle (θ) from the set target steering angle (θt) is greater than the predetermined upper limit value of the deviation (Δ), the target steering angle (θt) is changed to a value (θ+Δ) obtained by adding the upper limit value of the deviation (Δ) to the steering angle (θ), if the deviation is less than a negative value (−Δ) of the predetermined upper limit value of the deviation (Δ), the target steering angle (θt) is changed to a value (θ−Δ) obtained by subtracting the upper limit value of the deviation (Δ) from the steering angle (θ), and if an absolute value of the deviation is less than the predetermined upper limit value of the deviation (Δ), the target steering angle (θt) remains unchanged.

16. The steering control apparatus as claimed in claim 10, further comprising:
a basic steering assist torque calculating part configured to calculate a target steering torque (Ta) based on a steering torque; and
a steering assist torque controlling part configured to control a steering assist torque applied to the steering by the actuator based on the calculated target steering torque (Ta).

17. A steering apparatus used for a vehicle comprising:
a steering control apparatus as claimed in claim 2; and
an electric power steering apparatus including the actuator to be controlled by the steering control apparatus.

18. A steering apparatus used for a vehicle comprising:
a steering control apparatus as claimed in claim 10; and
an electric power steering apparatus including the actuator to be controlled by the steering control apparatus.

* * * * *